United States Patent
Robinson et al.

(10) Patent No.: US 6,889,553 B2
(45) Date of Patent: May 10, 2005

(54) METHOD AND APPARATUS FOR VIBRATION SENSING AND ANALYSIS

(75) Inventors: James C. Robinson, Knoxville, TN (US); Nicolas Fulciniti, Lancaster, NY (US); Mitchell J. Illig, West Seneca, NY (US); William J. Ashton, Cincinatti, OH (US)

(73) Assignee: PCB Piezotronics Inc., Depew, NY (US)

(*) Notice: Subject to any disclaimer, the term of this patent is extended or adjusted under 35 U.S.C. 154(b) by 0 days.

(21) Appl. No.: 10/604,386

(22) Filed: Jul. 16, 2003

(65) Prior Publication Data

US 2005/0011266 A1 Jan. 20, 2005

(51) Int. Cl.[7] .............................................. G01N 29/00
(52) U.S. Cl. ............................ 73/649; 73/659; 73/660
(58) Field of Search ........................ 73/649, 659, 660, 73/662, 602, 593, 771, 789, 815

(56) References Cited

U.S. PATENT DOCUMENTS

| | | | | |
|---|---|---|---|---|
| 4,729,239 A | | 3/1988 | Gordon | 73/593 |
| 4,776,590 A | * | 10/1988 | Krent et al. | 473/522 |
| 4,992,997 A | * | 2/1991 | Bseisu | 367/82 |
| 5,381,692 A | | 1/1995 | Winslow et al. | 73/593 |
| 5,511,422 A | | 4/1996 | Hernandez | 73/593 |
| 5,581,016 A | * | 12/1996 | Gonzalez et al. | 73/35.06 |
| 5,703,295 A | | 12/1997 | Ishida et al. | 73/593 |
| 5,734,087 A | * | 3/1998 | Yamashita | 73/1.15 |
| 5,852,793 A | * | 12/1998 | Board et al. | 702/56 |
| 5,895,857 A | | 4/1999 | Robinson et al. | 73/660 |
| 5,952,587 A | * | 9/1999 | Rhodes et al. | 73/862.541 |
| 6,053,047 A | | 4/2000 | Dister et al. | 73/593 |
| 6,116,089 A | | 9/2000 | El-Ibiary et al. | 73/593 |
| 6,370,957 B1 | | 4/2002 | Filippenko et al. | 73/660 |
| 6,679,119 B2 | * | 1/2004 | Board | 73/579 |
| 2001/0042229 A1 | | 11/2001 | James | |
| 2002/0139191 A1 | | 10/2002 | Hedeen et al. | |

* cited by examiner

*Primary Examiner*—Daniel S. Larkin
*Assistant Examiner*—Jacques M. Saint-Surin
(74) *Attorney, Agent, or Firm*—Simpson & Simpson, PLLC

(57) ABSTRACT

A method and apparatus for sensing and measuring stress waves. The method comprises the steps of: a.) sensing motion, where the motion comprises a stress wave component and a vibration component; b.) separating the stress wave component from the vibration component with a high pass filter to create a signal proportional to the stress wave; c.) amplifying the signal to create an amplified signal; d.) processing the amplified signal with a sample and hold peak detector over a predetermined interval of time to determine peaks of the amplified signal over said predetermined period of time; e.) creating an output signal proportional to the determined peaks of the amplified signal; and, f.) repeating steps d.) and e.). The invention also includes an apparatus for implementing the method of the invention.

13 Claims, 8 Drawing Sheets

METHOD AND APPARATUS FOR VIBRATION SENSING AND ANALYSIS

FIELD OF THE INVENTION

The present invention relates generally to an improved vibration sensing and analysis method and apparatus. More specifically, the invention relates to a method and apparatus for measuring macroscopic and microscopic vibration of machines, which includes the use of a selectable high pass filter, logarithmic amplifier, sample and hold peak detector, and peak averager.

BACKGROUND OF THE INVENTION

Rotating members generally are supported by a stationary body through bearings where, for example, the outer race of the bearing is permanently affixed to an outer housing and the inner race is permanently affixed to a rotating shaft. Rollers are placed between the inner and outer races and permit, with proper lubrication, the rotating element to turn freely with little restraint. If the rolling element experiences forces which cause it to operate off rotational center, forces are transmitted to the stationary body through the bearings inducing slight oscillatory motion of the outer housing. A vibration sensor, such as an accelerometer, placed on the housing will output a signal linearly related to the oscillatory motion of the normally stationary body. There can be many sources which introduce this oscillatory macroscopic motion of the machine housing. The analysis of this motion is referred to as vibration analysis. It is employed to monitor the status of the rotating equipment to provide early warnings of potential faults. This macroscopic motion is more broadly modal excitation. The excitation sources can be unbalance, misalignment, improper gear meshing, a loose machine relative to its housing, defective bearings, etc.

In addition to the oscillatory motion (vibration) introduced on a macroscopic scale, many faults commonly experienced in bearings, gears, etc., also introduce, on a microscopic scale, stress wave packets which propagate away from the initiation site at the speed of sound in the media (e.g., metal). These stress wave packets are short-term, fractional to a few milliseconds, transient events which accompany events such as metal-to-metal impacting, fatigue cracking, friction, and similar events. The source of the stress wave initiation is generally concentrated in a small region which generates primarily "s" waves. As "s" waves propagate away from the initiation site, they introduce a "ripple" traversing on the surface of the housing. This ripple will induce an output in an accelerometer (which responds to absolute motion) or other sensors such as strain gages, etc. Since an accelerometer is generally the sensor of choice for the macroscopic (vibration) motion monitoring, it is logical to also adopt the accelerometer as the sensor of choice for stress wave analysis.

Appropriate analysis of these stress wave packets provide valuable insight to the presence of mechanical faults as well as assistance in identifying the severity of the fault. Typically, the stress activity is easily separated from the more macroscopic (vibration) motion activity simply by routing the sensor (accelerometer) through a high pass filter to reject the lower frequency vibration driven component of the sensor (accelerometer) output. The all-important feature of "stress wave" analysis is the fact that stress waves are only present if a fault is present (i.e., a type of fault which generates stress waves, of which there are many). By capturing the level (such as peak g-levels) of the stress waves (the peak level must be the peak observed over a sufficient time, e.g., approximately 10+ rotations) and trending, a very reliable indicator for status regarding health of the rotating machinery is provided. This is especially true for rotating roller bearings.

The invention of this patent detects the presence of stress waves and outputs the peak g-level of the stress wave activity which occurs over a pre-set time period. In a preferred embodiment, the time period encompasses 10+ revolutions of the machine (bearing) being monitored, although fewer revolutions might suffice. The output can be continuous (voltage, current, light) and updated at the end of each pre-set time increment and/or periodic in an automated sense (e.g., level transmitted on a fixed time interval by wireless means) or as interrogated from an external source. The peak g-level obtained from the apparatus of the invention will a) be trended and b) initiate alert/fault levels. The alert/fault levels will have predetermined action levels to be executed by the appropriate groups.

When monitoring the stress wave activity of machinery, healthy machinery will have no or very little stress wave activity (<0.5 g typically), but machinery with faults can have significant g-levels (50 g's is not unusual). Therefore, the dynamic range of a suitable sensing and analysis instrument must be in the 50–100 dB range. For an instrument operating in the linear domain, this dynamic range is not practical without a) scale changing (shift linear range upward or downward through changing gains) or b) defining a lower signal level at which no attempt is made to resolve. An alternative approach, improvement to the sensor, is to switch to a non-linear output relative to input through, for example, employing a logarithmic amplifier which is readily available with a 100 dB dynamic range.

The "peak g-level" value is acquired by selecting the peak value captured over a time interval sufficient to encompass, in a preferred embodiment, a minimum of 6+ revolutions of the machine being monitored (it is necessary to incorporate greater than 2.5 revolutions since some faults reach their peak value only once per 2.5 or so revolutions). It is possible that an occasional observed peak value is bogus (i.e., not machine related). An improvement of the sensor of the present invention is to accommodate these "bogus" readings in such a manner as to maintain the integrity of the sensor output. One means to accomplish this is to collect many "peak values" over short time durations and then select the "peak value" for the desired time increment (sufficient to encompass the desired number of revolutions) based on a statistical analysis to separate out the statistical "outliers". Another means, in a preferred embodiment, is to establish a "running average" of the "peak values" over the last "N" ("N" can be defined to be any value, but the probable range would be 3–10) values observed. This "running" average can be accomplished through simple electronic means.

Others have patented various inventions related to vibration analysis, but none of these patent teach stress wave detection and analysis as in the present invention.

For instance, U.S. Pat. No. 4,729,239 (Gordon) discloses a vibration tester for ball bearings and associated devices. This patented invention, directed to the testing of a miniature ball bearing, uses an accelerometer to pick up the movement of the bearing and sense the vibration signal therefrom, an integrator to obtain a velocity measurement, and an output to detect any frequencies resulting from a flaw in the miniature bearing.

U.S. Pat. No. 5,381,692 (Winslow et al.) discloses a bearing assembly monitoring system which measures both vibration and temperature in real time.

U.S. Pat. No. 5,511,422 (Hernandez) discloses a personal computer based method and apparatus for analyzing and detecting faults in bearings and other rotating components that slip. The device senses vibration with an accelerometer sensor and shaft encoder, and processes the signals by a series of steps to generate coherently averaged spectra and derived features that indicate defects in, or certain other features, of machine components that slip or rotate asynchronously.

U.S. Pat. No. 5,703,295 (Ishida et al.) discloses a vibration sensing method and apparatus therefor. The invention includes an acceleration sensor for outputting a sensing signal corresponding to vibration, a level discriminator for generating an output when the output level of the accelerometer exceeds a preset reference level, a display unit for displaying the output of the level discriminator, a piezoelectric ceramic power generating unit for generating a charge when it is subjected to vibration, and a conversion unit for converting the charge generated by the piezoelectric ceramic generating unit into DC power for use by the apparatus.

U.S. Pat. No. 5,895,857 (Robinson et al.) discloses a vibration sensor and processing device comprising a peak detector operatively arranged to detect peak amplitude values over a predetermined period of time.

U.S. Pat. No. 6,053,047 (Dister et al.) discloses a diagnostic system for determining faults in multiple bearings using one vibration sensor. The system analyzes vibration signatures about critical frequencies to determine the health of a rotating machine.

U.S. Pat. No. 6,116,089 (El-lbiary et al) discloses a method and apparatus for identifying defects in a rotating machine system. The invention uses a vibration signature comparison method, which stores the vibration signature of a healthy machine in memory and compares it with a vibration signature obtained later to diagnose state of the machine.

U.S. Pat. No. 6,370,957 (Filippenko et al.) discloses yet another vibration analysis method for predictive maintenance of a rotating machine. This invention uses collected vibration data to calculate a set of statistical parameters of vibration such as root mean square (RMS), kurtosis (KU), crest factor (CF), high frequency enveloping (HFE) as well as trending of the mean values of the selected areas of averaged spectra. The combination of the values is used to calculate two general output values characterizing a mechanical condition of the rotating machine.

U.S. Patent Application Publication No. US2001/0042229 (James) discloses a fault monitoring system that includes an integrator that counts in one direction when a fault is detected and counts in an opposite direction in the absence of fault detection. The system enables one to distinguish between intermittent and hard faults.

U.S. Patent Application Publication No. US2002/0139191 (Hedeen et al.) discloses a system and method for conditioned-based monitoring of a bearing assembly. The system comprises a sensor placed in proximity to a bearing assembly, which generates a signal indicative of the amplitude and frequency of the vibrational movement of the bearing assembly. A process in communication with the sensor receives the signal from the sensor and generates spectral data representative of the bearing vibrational movement. A database comprises data representative of an amplitude threshold, for at least one predetermined frequency, characteristic of a bearing fault.

However, while the above-identified devices are operatively arranged to detect and monitor macroscopic vibrations, as discussed previously, other types of vibration can be sensed on the microscopic scale. For example, metal-on-metal impacting, metal fatigue, metal cracking, friction and like create stress wave packets that propagate away from the vibration initiation sight at the speed of sound. Stress wave packets are generally short lived, transient events that last only a few milliseconds; they are typically concentrated in small regions that generate "S" waves. As "S" waves propagate away from the initiation site, "ripples" are created, which traverse the surface of the housing. In many cases the ripples can induce an output in an accelerometer (which responds to absolute motion) or other types of sensor, such as strain gauges, etc. Thus, because both macroscopic motion and microscopic waves can induce an output in an accelerometer, it is only logical to use an accelerometer for stress wave analysis.

Fundamental to stress wave analysis is the fact that stress waves are only present when a fault is present, that is, a fault that generates a stress wave. Hence, the analysis of stress waves can provide valuable insight as to the presence of mechanical faults and/or assist in the determination of the severity of a fault.

Typically, stress wave activity can be separated from the macroscopic vibration by routing the signals output by the vibration sensor (accelerometer) through a high pass filter that is calibrated to reject lower frequency vibration signals. By capturing the levels, such as peak g-levels, of the stress waves (where peak level is peak observed over time, for example, 10+ rotations) and analyzing the output, the status, or health of a machine can be determined, especially in the case of a machine comprising rotating roller bearings.

In view of the above, what is needed then is a method and apparatus for sensing and measuring macroscopic and microscopic vibrations in machines using an accelerometer to create vibration signals, processing the vibration signals with a high pass filter to create filter vibration signals, processing the filtered vibration signals with a logarithmic amplifier to create amplified signals, processing the amplified signals with a sample and hold peak detector to determine peaks of the amplified signals, and, average the peaks of the amplified signals.

SUMMARY OF THE INVENTION

The present invention broadly comprises a method and apparatus for sensing and measuring stress waves. The method comprises the steps of: a.) sensing motion, where the motion comprises a stress wave component and a vibration component; b.) separating the stress wave component from the vibration component with a high pass filter to create a signal proportional to the stress wave; c.) amplifying the signal to create an amplified signal; d.) processing the amplified signal with a sample and hold peak detector over a predetermined interval of time to determine peaks of the amplified signal over said predetermined period of time; e.) creating an output signal proportional to the determined peaks of the amplified signal; and, f.) repeating steps d.) and e.). The invention also includes an apparatus for implementing the method of the invention.

In one of the embodiments of the apparatus of the invention, the high pass filter is selectable about two different frequencies (1 KHz and 5 KHz), although the selectable high pass filter is an optional circuit component.

In a preferred embodiment of the apparatus of the invention, the apparatus comprises an accelerometer to create at least one vibration signal, and an electronic circuit to perform the remaining steps of the method.

A general object of the invention is to provide a method and apparatus for sensing and measuring stress waves.

This and other objects, features and advantages of the invention will become readily apparent to one having ordinary skill in the art upon study of the following detailed description in view of the drawings and appended claims.

DETAILED DESCRIPTION OF THE PREFERRED EMBODIMENT

Figure 1:
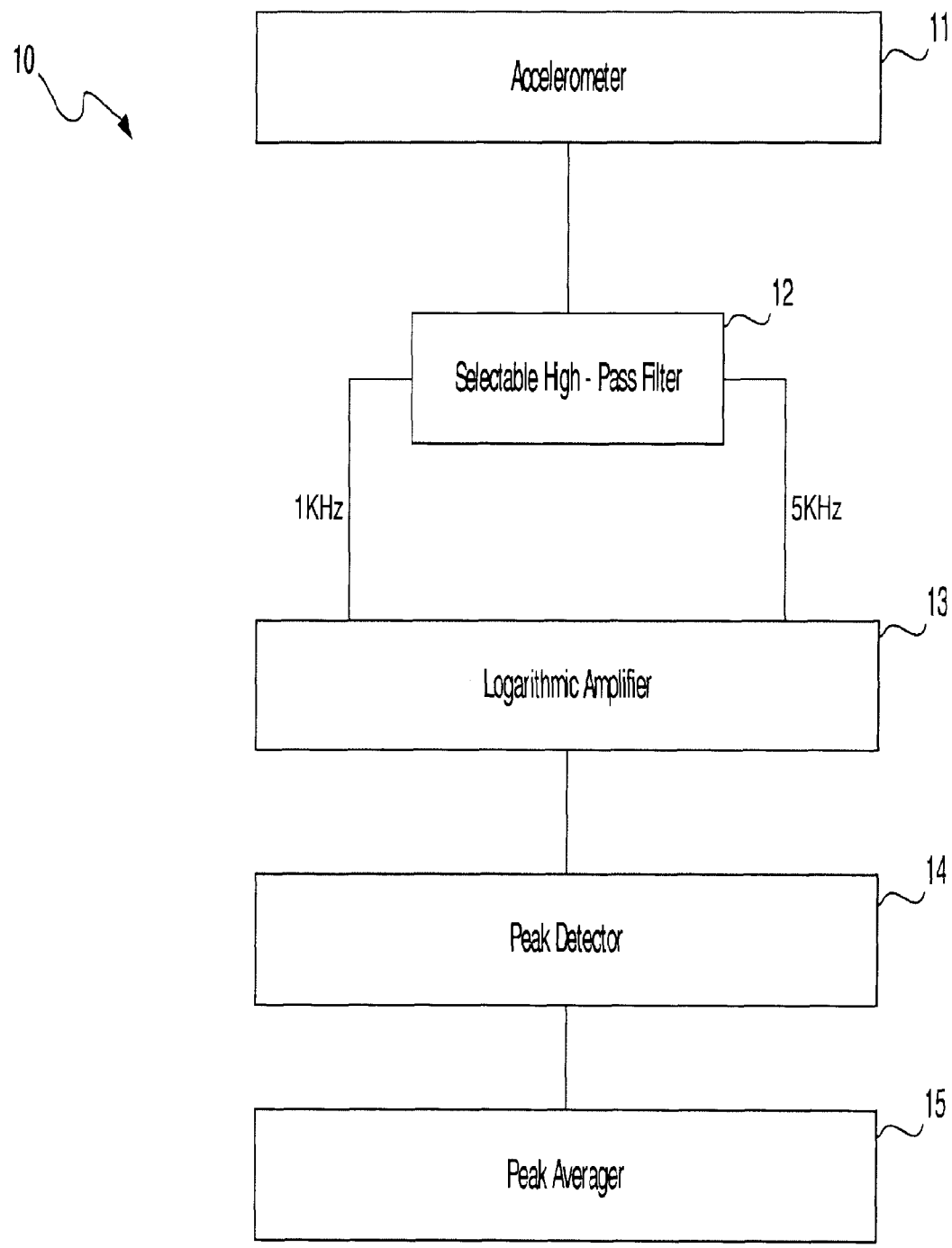
FIG. 1 is a flow chart which illustrates the main circuit elements of the apparatus of the invention, which circuit elements also correspond to the main steps of the method of the invention.
Figure 2:
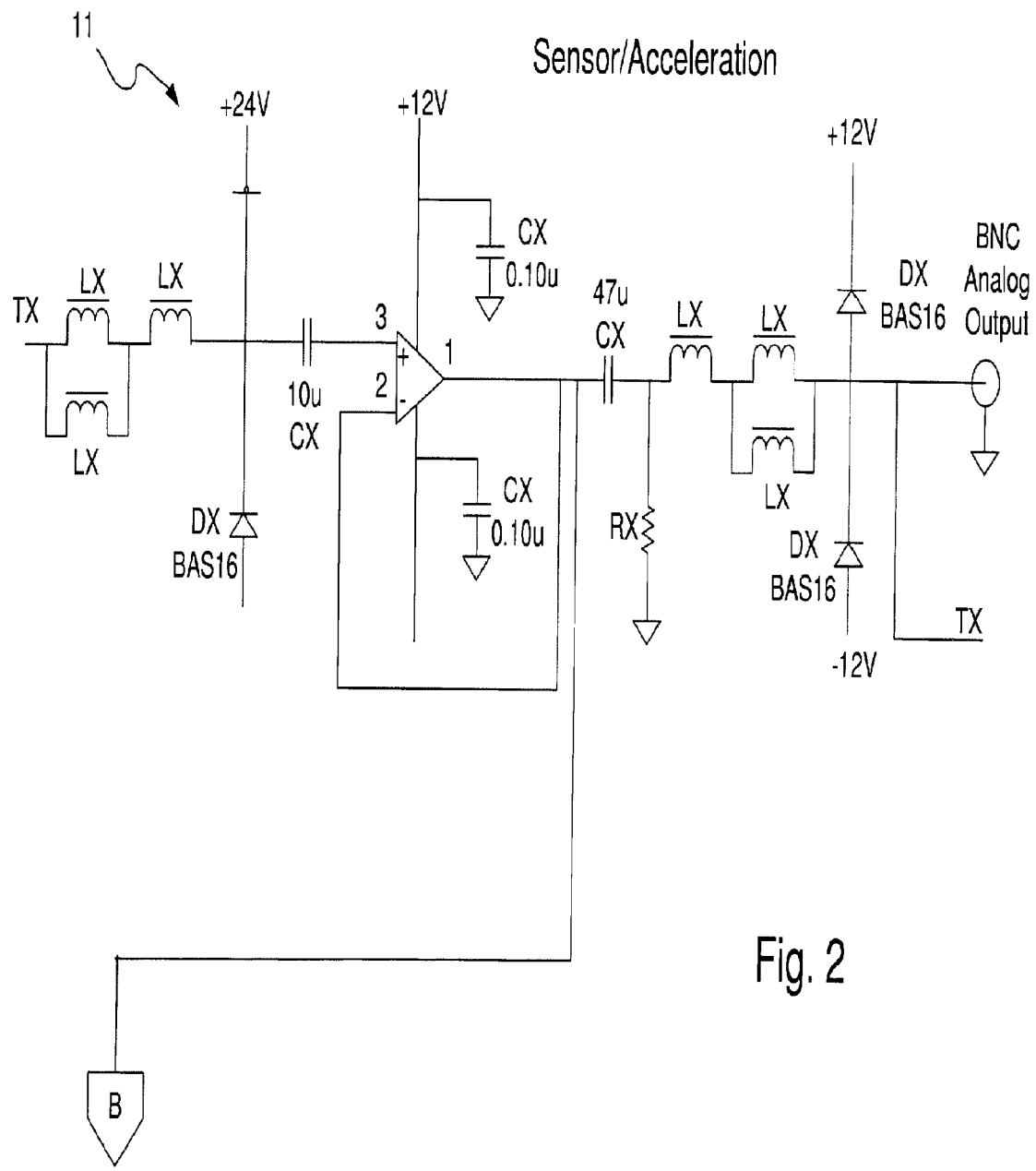
FIG. 2 illustrates the accelerometer of the present invention and its associated circuit elements.

At the outset it should be appreciated that identical reference numbers on different drawing views represent identical circuit components or elements. It should also be appreciated that the drawing figures illustrate an actual circuit diagram, with all circuit elements and values thereof, sufficient to enable one having ordinary skill in the art to make and use the invention. Finally, it should be appreciated that, while the disclosed circuit represents the best mode of practicing the apparatus of the invention, it is by no means the only mode. The method of the invention may be implemented by other circuits with other components. Not all of the circuit elements in the disclosed circuit are necessary. For example, in some applications, a strain gauge may be preferable to an accelerometer. Also, different target frequencies for the high pass filter (or, alternatively, a band pass filter) of the circuit may be used.

Generally, in a preferred embodiment the present invention is operatively arranged to detect the presence of vibration and stress waves in machines and to output the peak g-level of stress wave activity over a predetermined period of time. In a preferred embodiment, the time period for detecting the presence of the stress waves comprises ten or more revolutions of a rotating element of a machine comprising a rotating element. It should be appreciated by those having ordinary skill in the art, however, that ten revolutions are not required to determine a time period.

The output of the apparatus may comprise a continuous output, such as voltage, current, or light and may be updated at the end of each predetermined time period. The output may also be periodic, that is, the level of the stress waves may be transmitted on a fixed time interval by wireless means or interrogated from an external source. The peak g-level obtained from the apparatus may be analyzed (trended) and used to initiate alert/fault levels. The alert/fault levels may have predetermined action levels that may be executed by appropriate groups.

In a preferred embodiment, the "peak g-level" value is acquired by selecting among the peak values captured over period of time sufficient to encompass at least six (6) rotations of the machine being monitored. In most cases, it is generally necessary to incorporate more than 2.5 revolutions because some faults will only reach their peak value once every 2.5 revolutions.

It should also be appreciated that it is possible that an occasional observed peak value may be false. Thus, a preferred embodiment comprises means for addressing false readings and maintaining the integrity of the output. One such means collects peak values over a period of time and then selects the peak value for that time period via well-known statistical analyses and electronic components. Another means comprises establishing a "running" average of peak values over "n" values observed, preferably where "n" is between three (3) and ten (10). The running average operation may be created using electronic means commonly known to those having skill in the art.

When monitoring stress wave activity, healthy machinery generally has no stress wave activity or very little stress wave activity (less than 0.5 g). However, machinery with faults can have significant g-levels (50.0 g). Therefore, the dynamic range of the present invention is operatively arranged to detect stress wave activity over a 100 dB dynamic range. For an instrument operating in the linear domain, the 100 dB dynamic range is not practical without scale changing means (shifting the linear range upward or downward through changing gains) or defining a lower signal level at which no attempt to resolve is made. As an alternative, an improvement to the method and apparatus may comprise switching to a non-linear output relative to input by, for example, employing a logarithmic amplifier, which is readily available with a 100 dB dynamic range.

Adverting now to the drawings, FIG. 1 broadly illustrates vibration analysis 10, shown to comprise accelerometer 11, selectable high-pass filter 12, logarithmic amplifier 13, peak detector 14 and peak averager 15. Accelerometer 11 is a well-known device for measuring macroscopic and microscopic vibration. The macroscopic and microscopic vibration signals are passed from the accelerometer to high-pass filter 12, which in a preferred embodiment is a selectable high-pass filter. In the embodiment shown, the user can choose to pass signals having a frequency above 1 KHz or above 5 KHz. The reason for the selectable filter is that known fault frequencies exist in the 3–4 KHz range. Depending on circumstances, one might like to see signals at the low frequencies or may choose to ignore them and focus on higher frequencies. Logarithmic amplifier 13 is a well-known device that maximizes the input range by producing large output changes corresponding to relatively small input changes. This amplified signal then passes to sample-and hold peak detector 14, also a well-known device, which simply samples, measures and holds the highest peaks in the signal over time. The peak detector is controlled by a timing circuit, which can be variable. In a preferred embodiment, the timing circuit is set to approximately 7 seconds, although it could be set to range from 1–100 seconds. Once the peaks are detected and measured, the signal is passed to peak averager 15. The purpose of the peak averager is to eliminate false vibration readings. Occasional events may cause one or more individually high peaks (higher than normal), but this doesn't necessarily indicate a problem. By using a peak averager, the individual peaks are averaged, creating a weighted effect, with the result that a temporary high peak reading will not cause a false vibration alarm. A true alarm condition would be indicated only when the averaged peaks exceed predetermined minimums for a period of time.

Figure 3:
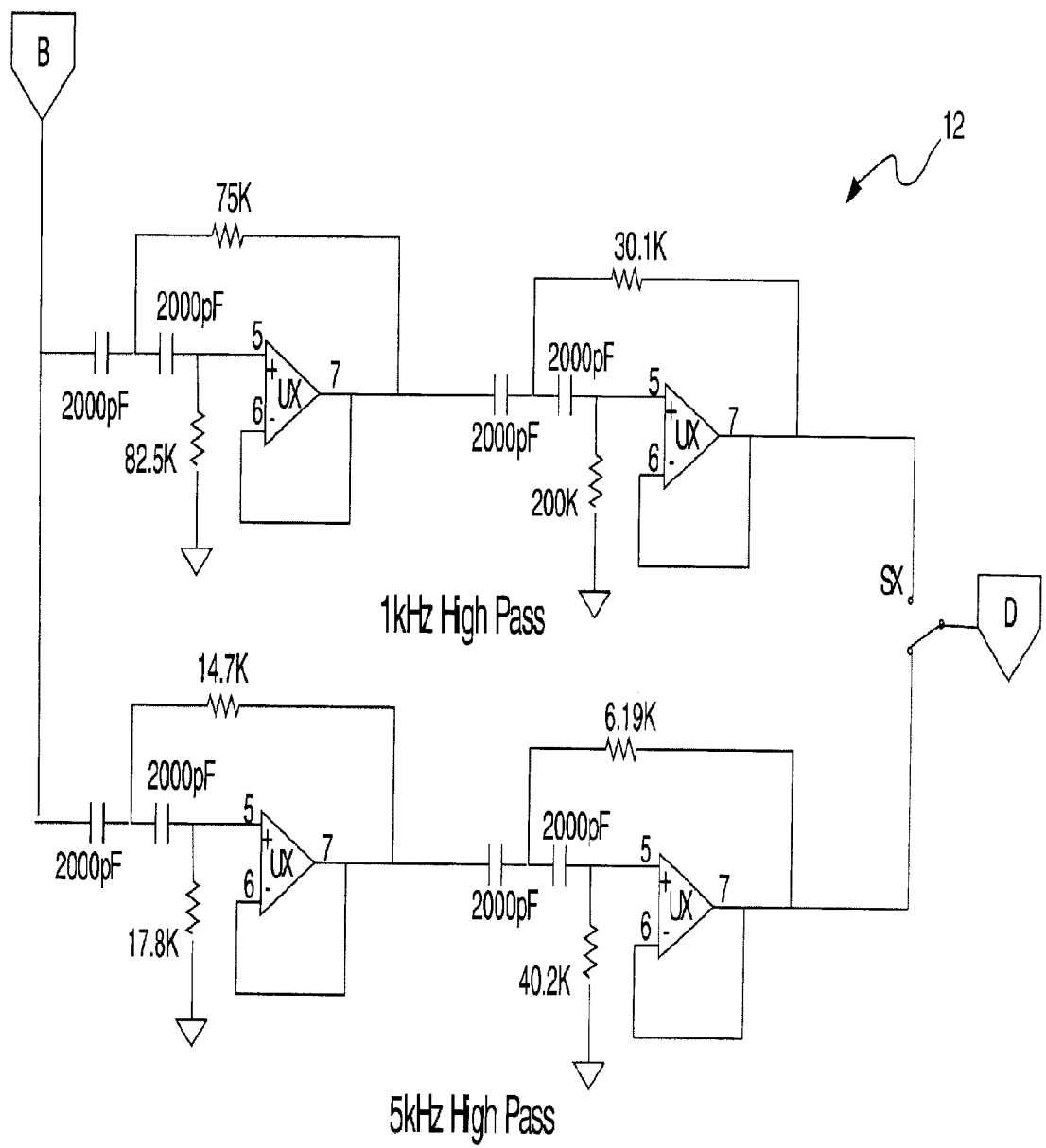
FIG. 3 illustrates the selectable high-pass filter of the invention.

The circuit of the system is illustrated in FIGS. 2–8. Accelerometer 11 (which includes accelerometer sensing device TX and associated circuitry) senses macroscopic and microscopic vibration and this circuit amplifies the vibration signal and passes it to the high-pass filter at connector B. FIG. 3 illustrates the dual selectable high-pass filter 12 of the invention. A 1 kHz high-pass filter is illustrated in the top half of the drawing, and a 5 kHz high-pass filter is illustrated in the bottom half of the drawing. The inputs to each filter are joined (common), and switch SX is used to select the output of one of the filters to pass to logarithmic amplifier 13 via connector D.

Figure 4:
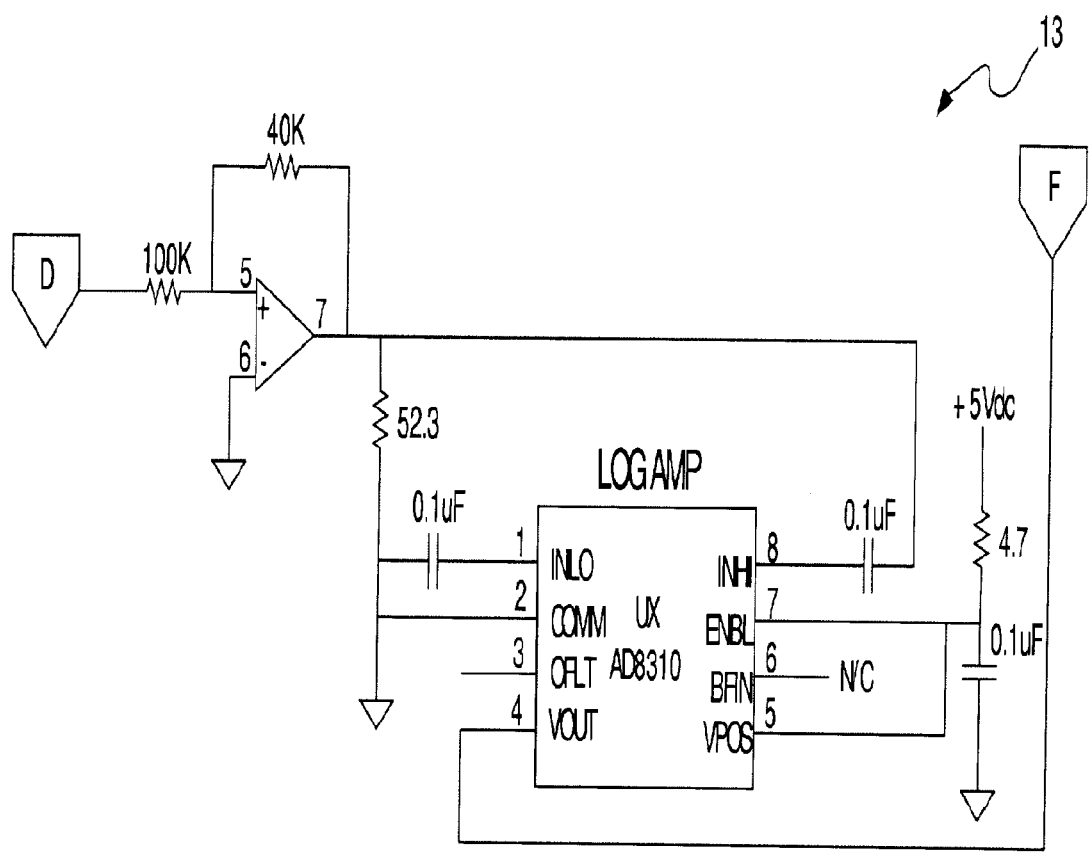
FIG. 4 illustrates the logarithmic amplifier of the invention.

Logarithmic amplifier 13 shown in FIG. 4 comprises integrated circuit UX AD8310 or equivalent and the associated circuitry shown. As is well known in the art, this amplifier amplifies the input signal present at D by a factor of log base 10. In other words, the output is proportional to the logarithm of a positive input voltage. The net result is an amplifier with a very wide dynamic range, i.e., it can translate input signals that are different by orders of magnitude (e.g., 1, 10, 100, 1000) into linear output signals (e.g., 0, 20, 40, 60).

Figure 5:
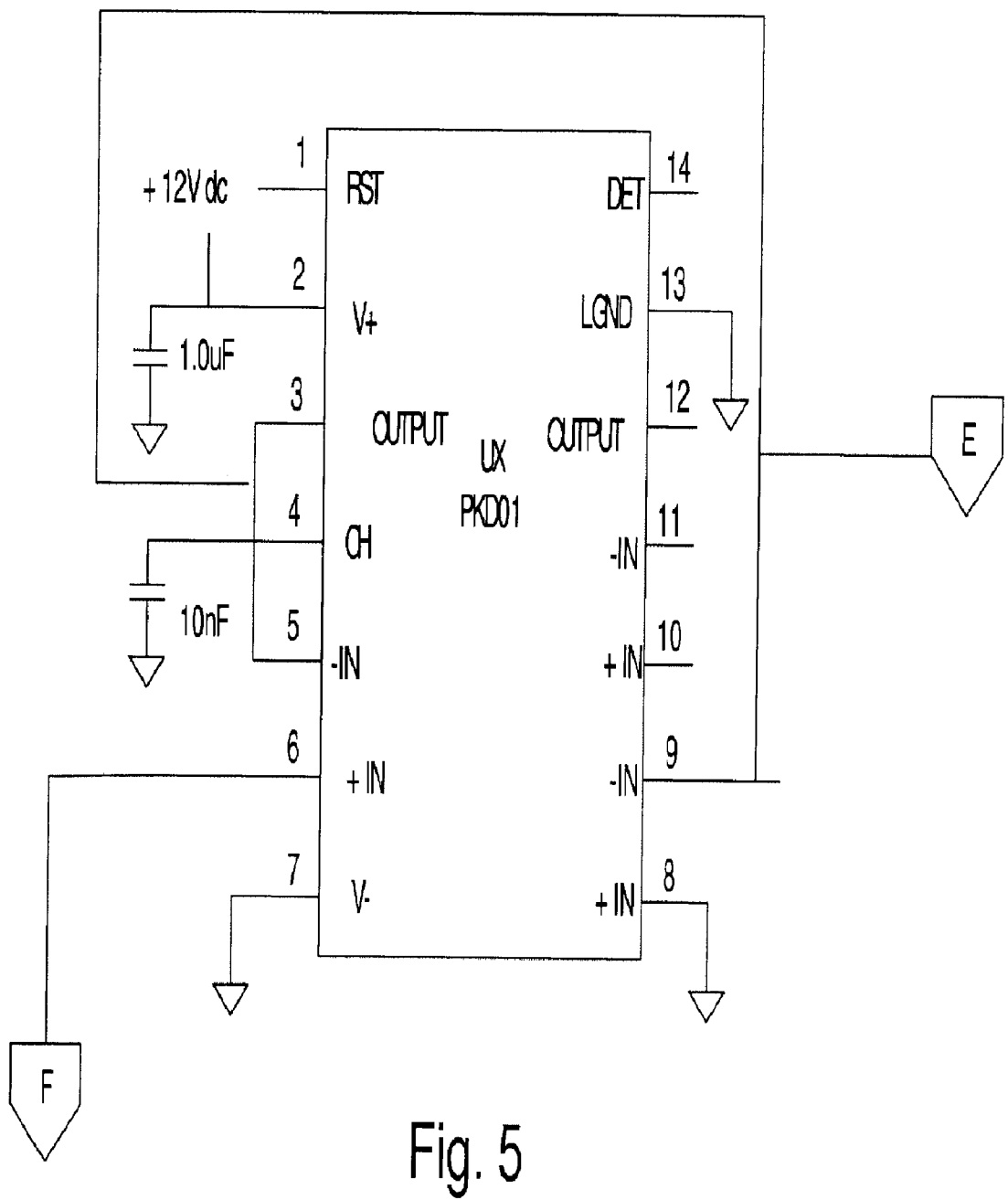
FIG. 5 illustrates the peak detector of the invention.
Figure 6:
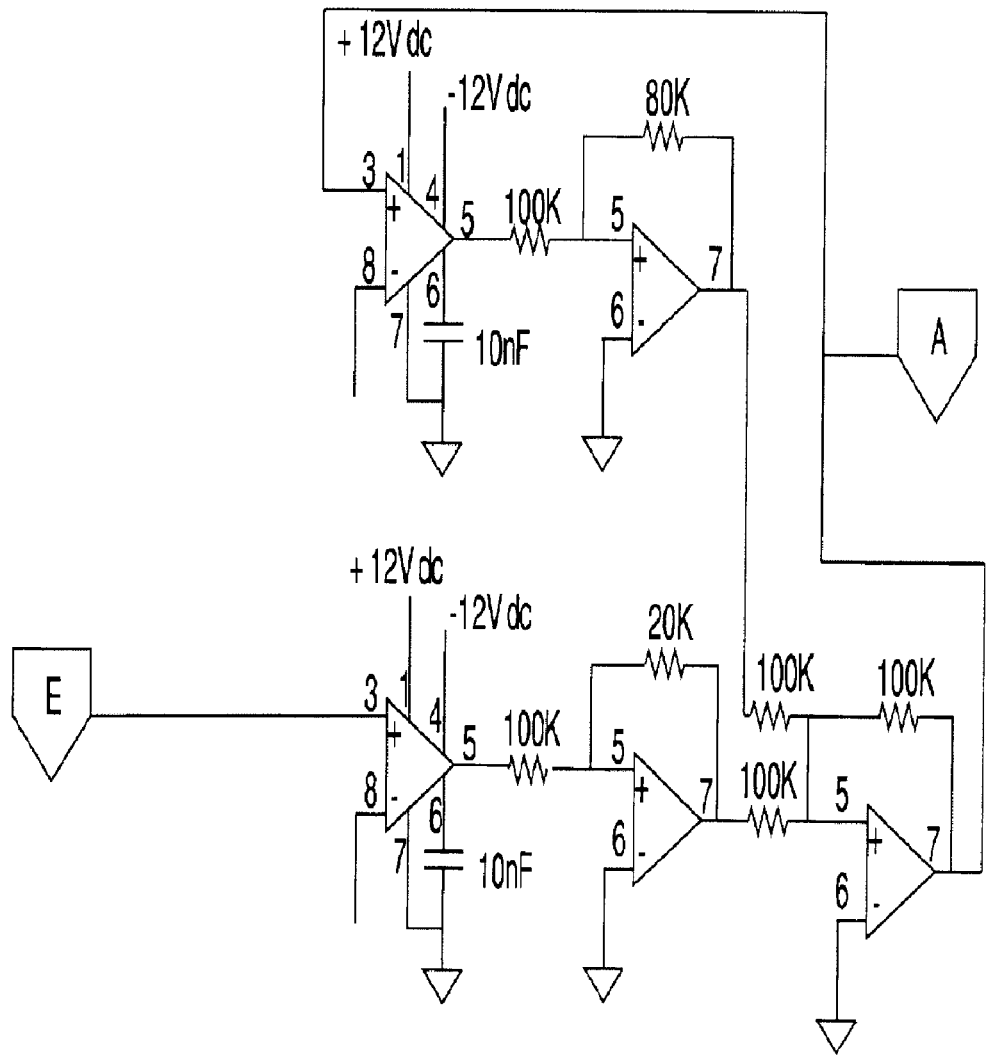
FIG. 6 illustrates the averager of the invention.

The logarithmically amplified signal enters peak detector 14 at connector F, as shown in FIG. 5. The peak detector functions to detect and measure the peaks of the amplified signal but does so in conjunction with a sample and hold circuit provided by the timing stage circuit illustrated in FIG. 8. The timing of the sample and hold circuit is variable, allowing the user to fine tune the analysis by narrowing the time period of interest. The circuit looks at a peak for a period of time, holds that peak, then resets the peak detector, and restarts the peak detection process. The peak detector is always detecting new peaks, while it holds them for a time, and the averaging circuit processes the last peak detected, averages it with the previous peak, and outputs the average peaks as an output signal, available at connector A in FIG. 6.

Figure 7:
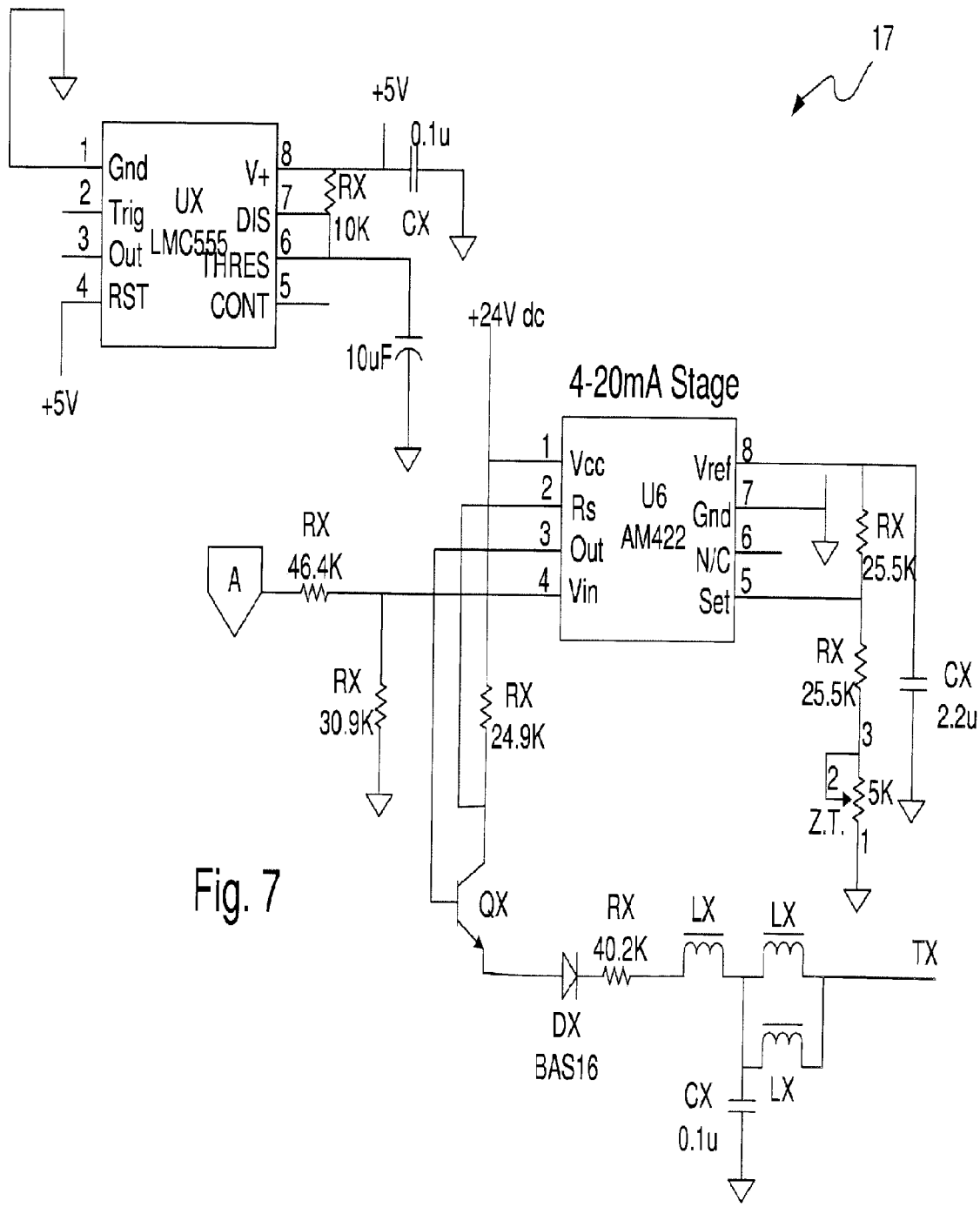
FIG. 7 illustrates the output stage of the invention.
Figure 8:
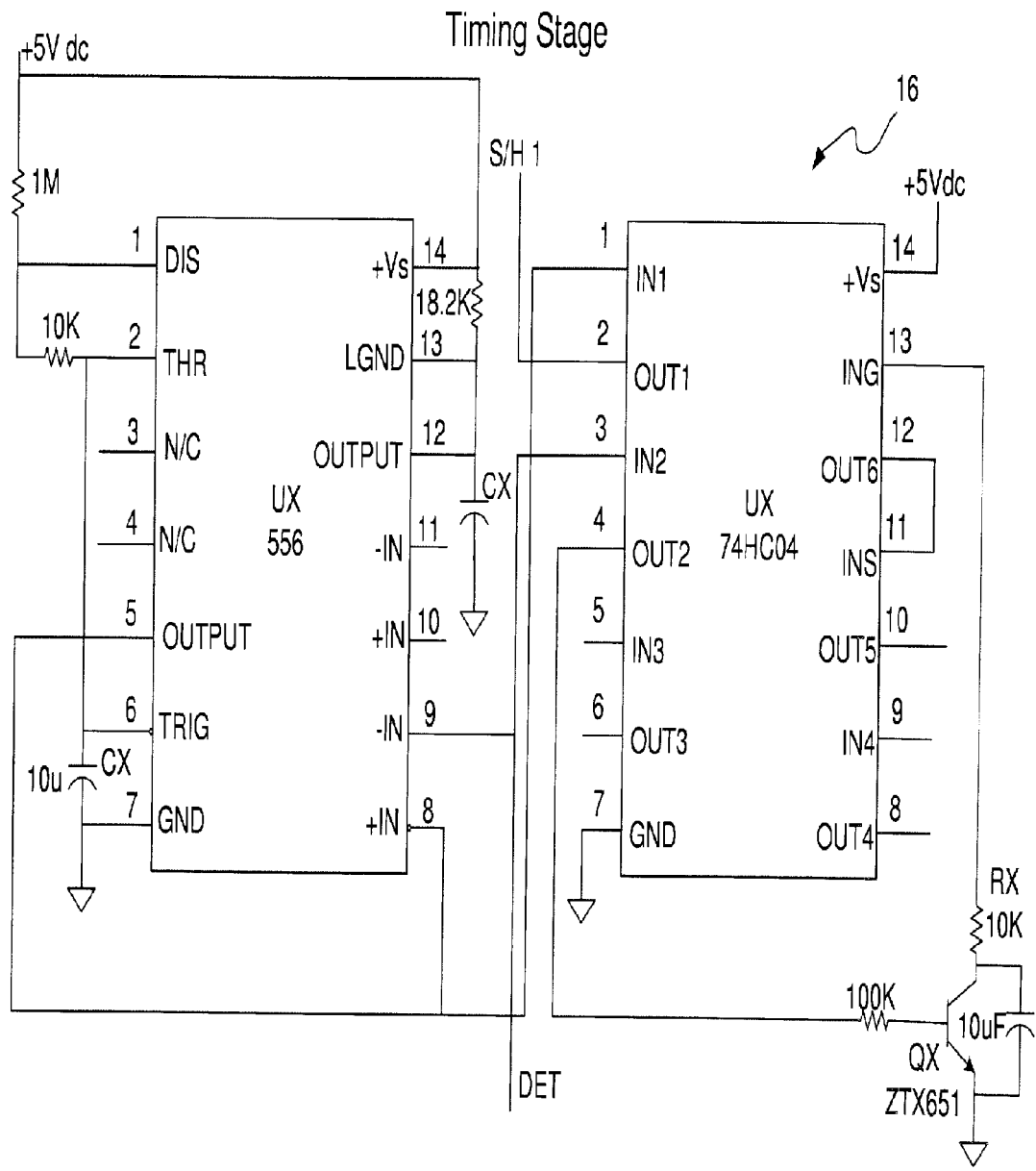
FIG. 8 illustrates the timing stage of the invention.

Output stage 17, shown in FIG. 7, processes the output signal from the averager circuit and converts the output into an industry standard signal in the range of 4–20 milliamps.

Thus, it is seen that the objects of the invention are efficiently obtained, although modifications and changes to the invention may be readily imagined by those having ordinary skill in the art, and these changes and modifications are intended to be within the scope of the claims.

What is claimed is:

1. A method for sensing and measuring stress waves, comprising:
    a.) sensing motion, where said motion comprises a stress wave component and a vibration component;
    b.) separating said stress wave component from said vibration component with a high pass filter to create a signal proportional to said stress wave;
    c.) amplifying said signal to create an amplified signal;
    d.) processing said amplified signal with a sample and hold peak detector over a predetermined interval of time to determine peaks of said amplified signal over said predetermined period of time;
    e.) creating an output signal proportional to said determined peaks of said amplified signal; and,
    f.) repeating steps d.) and e.).

2. The method recited in claim 1, further comprising the step of averaging said peaks of said amplified signal.

3. The method recited in claim 1 wherein said high pass filter is selectable about a plurality of frequencies.

4. The method recited in claim 2 wherein said high pass filter is selectable about 1 KHz and 5 KHz.

5. The method of claim 1 wherein said amplifying is done with a logarithmic amplifier.

6. The method of claim 1 wherein said sensing is done with an accelerometer.

7. The method of claim 1 wherein said sensing is done with a strain gauge.

8. An apparatus for sensing and measuring stress waves, comprising:
    a.) means for sensing motion, where said motion comprises a stress wave component and a vibration component;
    b.) means for separating said stress wave component from said vibration component to create a signal proportional to said stress wave;
    c.) means for amplifying said signal to create an amplified signal;
    d.) means for processing said amplified signal with a sample and hold peak detector over a predetermined interval of time to determine peaks of said amplified signal over said predetermined period of time;
    e.) means for creating an output signal proportional to said determined peaks of said amplified signal; and,
    f.) means for repeating steps d.) and e.).

9. The apparatus recited in claim 8 wherein said means for sensing is an accelerometer.

10. The apparatus recited in claim 8 wherein said means for sensing is a strain gauge.

11. The apparatus recited in claim 8 wherein said means for separating said stress wave component from said vibration component to create a signal proportional to said stress wave is a high pass filter.

12. The apparatus recited in claim 11 wherein said means for separating said stress wave from said vibration component to create a signal proportional to said stress wave comprises a selectable dual frequency high-pass filter, selectable to pass signals above at least two different frequencies.

13. The apparatus recited in claim 12 wherein said high-pass filter is selectable about 1 KHz or 5 KHz.

* * * * *